United States Patent [19]

Miller

[11] Patent Number: 4,529,112

[45] Date of Patent: Jul. 16, 1985

[54] CARRIER FOR FISHING RODS AND TACKLE

[76] Inventor: George A. Miller, 405 N. Bolton St., Romney, W. Va. 26757

[21] Appl. No.: 578,788

[22] Filed: Feb. 10, 1984

[51] Int. Cl.³ ............................................. A01K 97/10
[52] U.S. Cl. .................................... 224/202; 43/21.2; 224/226; 224/920; 224/922
[58] Field of Search ...................... 43/57.1, 54.1, 21.2; 224/149, 202, 235, 224, 920, 225, 922, 226, 904; 206/315.11; 312/202, 313

[56] References Cited

U.S. PATENT DOCUMENTS

| | | |
|---|---|---|
| 2,328,915 | 9/1943 | Mayer . |
| 2,513,538 | 4/1950 | Williams . |
| 2,555,073 | 5/1951 | Zdankoski ...................... 43/21.2 X |
| 2,596,403 | 5/1952 | Hoffman ............................. 43/21.2 |
| 2,687,834 | 8/1954 | Mathis . |
| 2,709,544 | 5/1955 | Barringer . |
| 2,781,958 | 2/1957 | Lewandowski . |
| 2,823,971 | 2/1958 | Hoyt . |
| 2,846,129 | 8/1958 | O'Brien . |
| 2,985,347 | 5/1961 | De Neve ............................ 224/149 |
| 3,182,872 | 5/1965 | Brosseau ............................ 224/202 |
| 3,399,009 | 8/1968 | Slade . |
| 3,437,389 | 4/1969 | Perkins et al. . |
| 3,638,843 | 2/1972 | Ortynski . |
| 3,678,611 | 7/1972 | Files . |
| 3,700,147 | 10/1972 | Vaughn .......................... 224/913 X |
| 4,014,466 | 3/1977 | Wess et al. . |
| 4,170,801 | 10/1979 | Ward . |

Primary Examiner—Henry K. Artis
Assistant Examiner—Robert Petrik
Attorney, Agent, or Firm—Munson H. Lane, Jr.

[57] ABSTRACT

A carrier for fishing rods and tackle to be worn by a fisherman comprises a carrier plate worn adjacent the hip on one side of the fisherman and supported by a shoulder strap, a tackle box pivotally mounted on the carrier plate to be selectively pivoted between a vertically oriented position and a horizontally oriented position, a latch for latching the tackle box in its vertically oriented position, a tackle drawer slidably mounted in the tackle box through an open side thereof, a telescoping and rotatable arm assembly mounting the drawer in the tackle box whereby the drawer may be pulled out of the tackle box in its vertically oriented position and rotated to a horizontal position in front of and adjacent the waist of the fisherman, a drawer latch for selectively latching the drawer in its closed position inside of the tackle box or in its open, horizontal position, fishing rod holders mounted on the tackle box for holding fully assembled fishing rods and reels or disassembled sections of one or more fishing rods thereon, one or more of the holders being channel-shaped and having an elongated recess for receiving a fishing rod and reel and devices extending over the recess for securing the fishing rod and reel therein.

17 Claims, 16 Drawing Figures

CARRIER FOR FISHING RODS AND TACKLE

BACKGROUND OF THE INVENTION

1. Field of the Invention

The invention relates to an improved carrier for fishing rods and tackle which is worn adjacent the hip on one side of a fisherman and is supported by a shoulder strap.

2. Description of the Prior Art

Various attempts have been made to satisfy the need of fishermen to carry a selection of various types of fishing rods and tackle in the field and along the streams which is readily within reach of the fisherman so that a quick change of rods and tackle can be made when different type fish and fishing conditions are encountered. Also it is desirable for the fisherman to have his hands as free as possible, particularly when traveling from place to place, for easy maneuverability.

Representative patents illustrative of the prior art seeking to meet the aforesaid need of fishermen are listed below:

| | |
|---|---|
| 2,328,915 | 3,399,009 |
| 2,513,538 | 3,437,389 |
| 2,687,834 | 3,638,843 |
| 2,709,544 | 3,678,611 |
| 2,781,958 | 4,014,466 |
| 2,823,971 | 4,170,801 |
| 2,846,129 | |

U.S. Pat. Nos. 2,328,915, 2,687,834, 2,781,958, 2,846,129 and 3,638,843 each disclose a carrier adapted to be attached to a belt worn around the waist of a fisherman for carrying fishing gear including either a fishing rod, or fishing tackle or both.

U.S. Pat. Nos. 2,709,544 and 3,678,611 disclose fishing rod and tackle carriers which are supported on one side of a fisherman by a shoulder strap.

U.S. Pat. Nos. 2,513,538, 2,823,971, 3,437,389, 3,399,009, 4,014,466 and 4,170,801 each disclose hand supported carriers for fishing gear. U.S. Pat. No. 2,823,971 discloses a tackle box with tying thongs for tying a fishing rod to one side of the tackle box. U.S. Pat. Nos. 4,014,466 and 4,170,801 each disclose clamping means for clamping fishing rods to the carrier.

None of the above mentioned patents disclose a carrier for fishing rods and tackle which has the versatility or which provides the easy access to fishing rods and tackle as does the present invention. Furthermore, none of the above patents disclose or suggest the structural combination of component parts found in the present invention.

SUMMARY OF THE INVENTION

It is an object of the invention to provide an improved carrier for fishing rods and tackle which is adapted to be worn by a fisherman adjacent the hip on one side and supported by a shoulder strap extending over the shoulder on the opposite side of the fisherman and across the chest (front and back).

It is another object of the invention to provide a carrier which offers easy access to a selection of fishing rods and fishing tackle so that the fisherman can quickly exchange one fishing rod for another, and easily select the desired tackle from an open tackle drawer which is supported horizontally in front and adjacent the waist of the fisherman.

It is a further object of the invention to provide a carrier for fishing rods and tackle which comprises a carrier plate supported alongside of one hip of the fisherman by an adjustable shoulder strap, belt or other suitable means, a tackle box pivotally mounted on the carrier plate to rotate between vertically oriented and horizontally oriented positions, fishing rod holders mounted on the face of the tackle box opposite the side by which the tackle box is mounted on the carrier plate, a latch for latching the tackle box in the vertically oriented position, a tackle drawer slidably mounted in an open side of the tackle box, a telescoping arm and slide assembly mounting the tackle drawer in the tackle box, the telescoping arm being rotatable to permit rotation of the open tackle drawer from a vertically oriented position to a horizontal position in front of the fisherman, the drawer having compartments for segregating various tackle devices, a cover closing the open side of the tackle drawer, latching means for latching the tackle drawer in either of its closed position inside of the tackle box or in its open horizontal position in front of the fisherman.

It is a further object of the invention that some of the fishing rod holders mounted on the front side of the tackle box be of open channel shape having a recess therein for receiving a fishing rod and reel and means acting in conjunction with each channel-shaped fishing rod holder to detachably secure a fishing rod and reel in the recess of the holder.

It is still another object of the invention to provide a line secured to the carrier and to the belt of the fisherman for holding the carrier close to the side of the fisherman.

A better understanding of the preferred embodiments of this invention will be achieved when the following detailed description is considered in conjunction with the appended drawings in which like reference numerals are used for the same parts as illustrated in the different figures.

DESCRIPTION OF THE PREFERRED EMBODIMENT

Figures 5, 6, 7, 8:
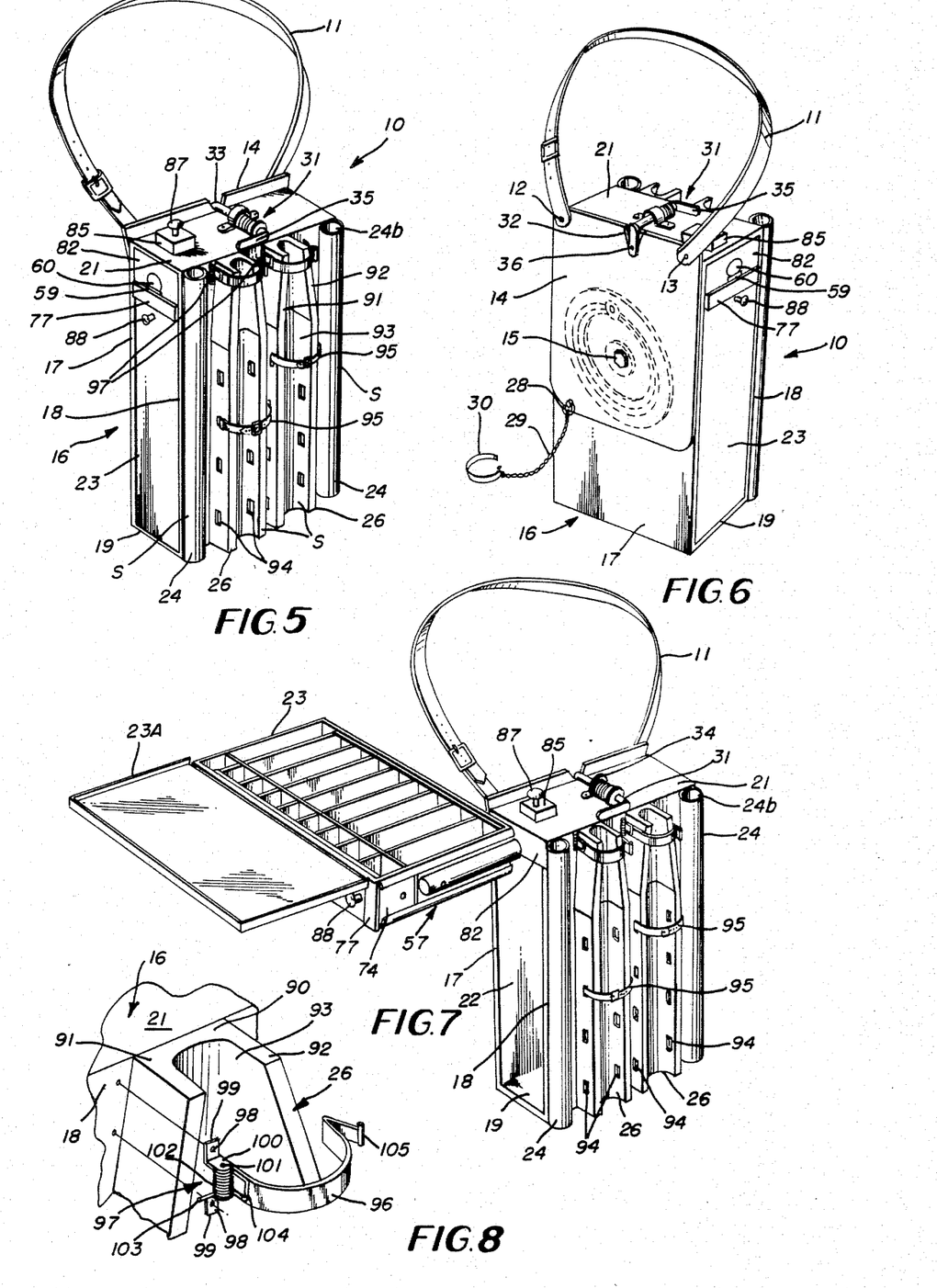
FIG. 5 is a perspective view of the carrier alone showing the top, front and drawer side of the closed tackle box.
FIG. 6 is a perspective view of the carrier rotated to show the top, rear and drawer side of the tackle box.
FIG. 7 is a perspective view similar to FIG. 5 but showing the open tackle drawer pulled out from the tackle box and rotated to a horizontal position.
FIG. 8 is an exploded, fragmentary perspective view showing the top portion of one of the fishing rod holders and clamping means mounted on the front of the tackle box seen in FIG. 7 but on an enlarged scale.

Referring to the drawings, and particularly to FIGS. 5 and 6, the carrier 10 comprises a shoulder strap 11 attached at its opposite ends by fasteners 12 and 13 to a flat carrier plate 14. A rectangular tackle box 16 is pivotally attached to the carrier plate 14 by a pivot 15. The tackle box 16 has a closed back 17, a closed front 18, three closed sides 19, 20 and 21 and an open side 22 through which slides a compartmented tackle drawer, or tray 23. A plurality of supports S for fishing rods F are mounted on the front of the tackle box 16. The fishing rod supports S are of different types and, as shown in FIG. 5, include a pair of cylindrical receptacles 24 mounted along the opposite outer edges of the tackle box 16 and a pair of open channel-shaped receptacles 26 mounted between the cylindrical receptacles 24.

Figures 1, 2, 3, 4:
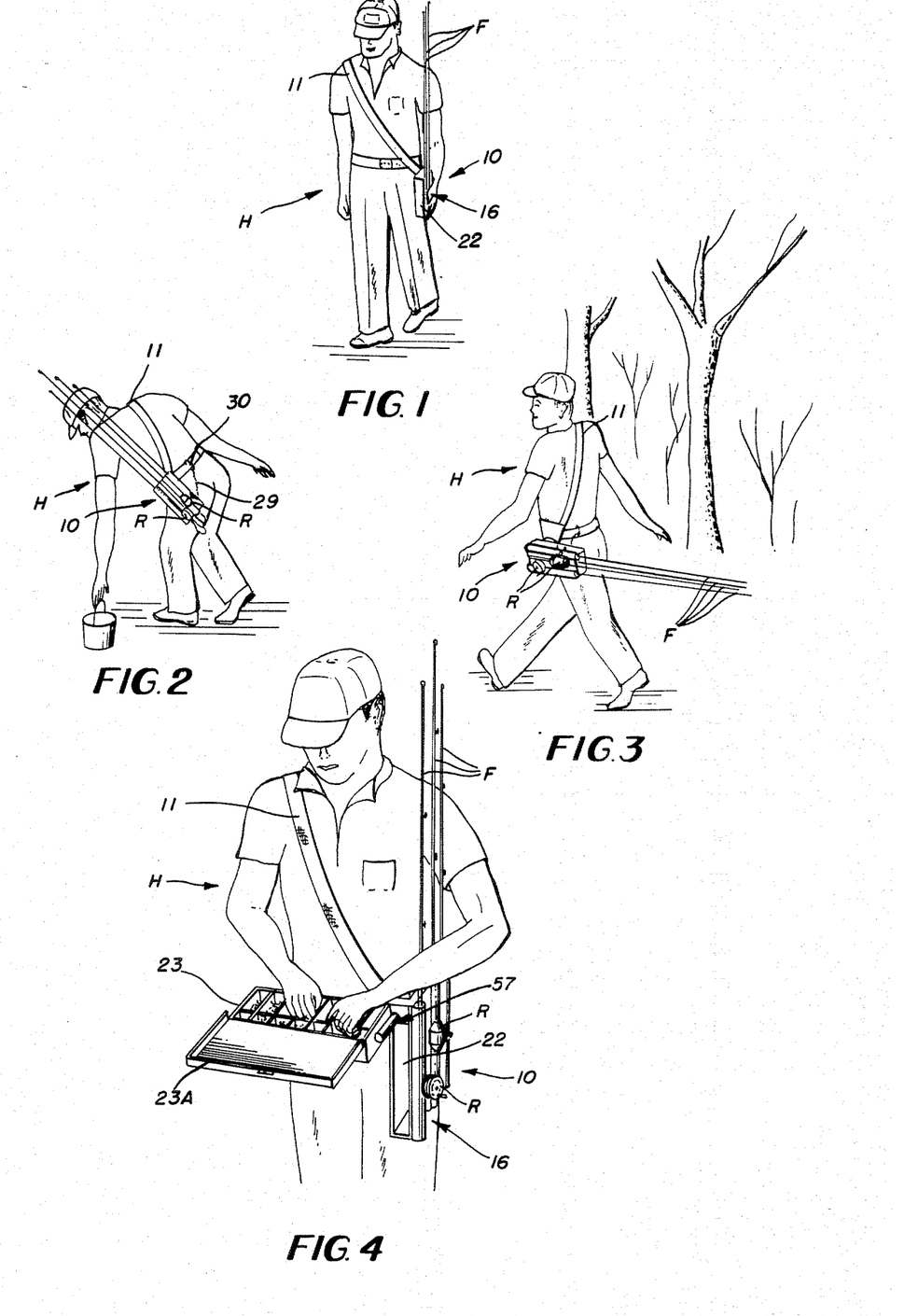
FIG. 1 is a perspective view of the carrier of this invention supported at the side of a fisherman by a shoulder strap, with the closed tackle box and attached fishing rods extending vertically.
FIG. 2 is a perspective of the rear and left side of a fisherman in a stooped position with the carrier at his side showing the carrier maintained close to the fisherman's hip by a belt engaging line extending from the carrier to the fisherman's belt.
FIG. 3 is a perspective view of a fisherman wearing the carrier at his side with the tackle box and attached fishing rods extending horizontally to facilitate walking in a wooded area.
FIG. 4 is a perspective view similar to FIG. 1, but showing the tackle drawer of the tackle box pulled out and rotated to a horizontal position in front of the fisherman.

In FIG. 4, a fisherman H is shown wearing the carrier 10 with the tackle box 16 supported by the carrier plate 14 in the vertical position, that is, with its longitudinal axis generally parallel with the body of the fisherman. The fishing rods F are, therefore, supported vertically. The tackle drawer 23 is shown pulled out of the tackle box and rotated 90° to a horizontal position in front of the fisherman, providing ready access to various items of fishing tackle stored in the drawer. The means for supporting the tackle drawer will be described subsequently.

FIG. 6 shows the backside of the carrier plate 14 and the backside of the tackle box 16. A ring 28 is attached to one side edge of the carrier plate 14 near the bottom and a flexible line 29 is connected between the ring 28 and a flexible strap 30 which is adapted to loop around a belt worn by the fisherman as shown in FIG. 2 to hold the carrier 10 close to the side of the fisherman when he bends over. When the fisherman wants to maintain the fishing rods and tackle box in a vertical position, a latch member 31 affixed to the top of the tackle box will be engaged in the V-shaped notch 32 at the top of the carrier plate 14.

When the fisherman wants to travel through a wooded area, he may swing the tackle box about its pivot 15 to a horizontal position, as shown in FIG. 3, by releasing the latch member 31 from the notch 32 and turning the tackle box in either direction. FIG. 3 shows the fishing rods F supported horizontally with their tips trailing the fisherman.

Figures 9, 10, 11, 12:
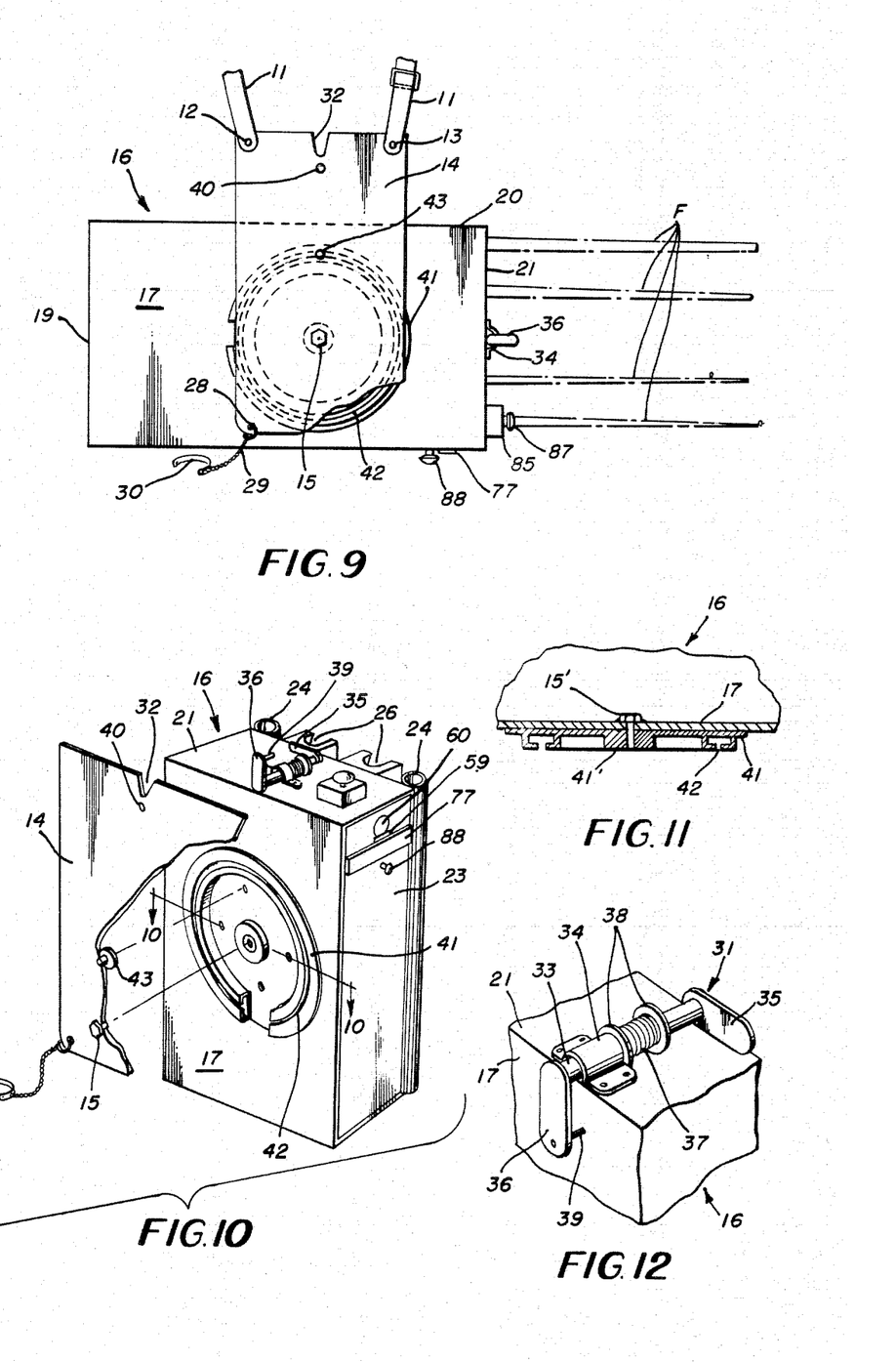
FIG. 9 is a rear elevational view of carrier with tackle box extending horizontally.
FIG. 10 is an exploded perspective rear view of the carrier plate and tackle box with a portion of the carrier plate broken away to show the circular track plate on the rear of the tackle box.
FIG. 11 is a sectional view taken along line 10-10 of FIG. 10.
FIG. 12 is a fragmentary perspective view of the top portion of the tackle box with latch means mounted thereon.

A detailed view of the latch member 31 is shown in FIG. 12. It includes a cylindrical bolt portion 33 which is rotatably and slidably secured to the top of the tackle box by means of a saddle-shaped bearing strap 34, a handle portion 35 bent perpendicular to the bolt portion 33 at one end and a latch portion 36 at the other end bent perpendicular to the bolt portion 33 and rotated 90° relative to the handle portion 35. In assembling the latch member 31, a compression spring 37 with thrust washers 38 at opposite ends thereof are loosely mounted on the bolt portion 33 between the handle portion 35 and the bearing strap 34 to normally bias the latch bolt toward the front of the tackle box 16. The latch portion 36 has a cylindrical pin 39 affixed thereto adjacent its free end which extends generally parallel to the bolt portion 33. The pin 39 is adapted to enter the hole 40 in the carrier plate 14 below the notch 32 (see FIGS. 9 and 10) and when engaged therein, the latch member 31 firmly holds the tackle box in its vertically oriented position.

To unlatch the tackle box so that it may be rotated on the carrier plate 14, the handle portion 35 is grasped and pushed rearwardly to disengage the pin 39 from the hole 40 in the carrier plate. The handle portion 35 is then rotated 180° clockwise, as viewed in FIG. 10, to lift the latch portion 36 to a 12 o'clock position. The handle portion 35 can then be released and the spring 37 will force the latch member 31 forward until the latch portion 36 is free of the notch 32. With the latch portion 36 free of the notch 32, the tackle box 16 can be rotated clockwise or counterclockwise about the pivot pin 15 to a horizontal position as seen in FIGS. 3 and 9.

In FIG. 10, the rear of the tackle box 16 is shown separated from the carrier plate 14. The latch portion 36 is seen raised to the unlatched position. A circular plate 41 is secured to the back 17 of the tackle box and is interposed between the tackle box 16 and the carrier plate 14 when the tackle box and the carrier plate are assembled. The circular plate 41 has a track 42 formed therein which cooperates with a stud or shoe 43 projecting from the front side of the carrier plate 14 above the pivot 15 in the 12 o'clock position, for guiding the pivoted motion of the tackle box 16, relative to the carrier plate 14, in a circular path and thus to add stability to the mounting of the tackle box on the carrier plate 14.

Figures 13, 14, 15, 16:
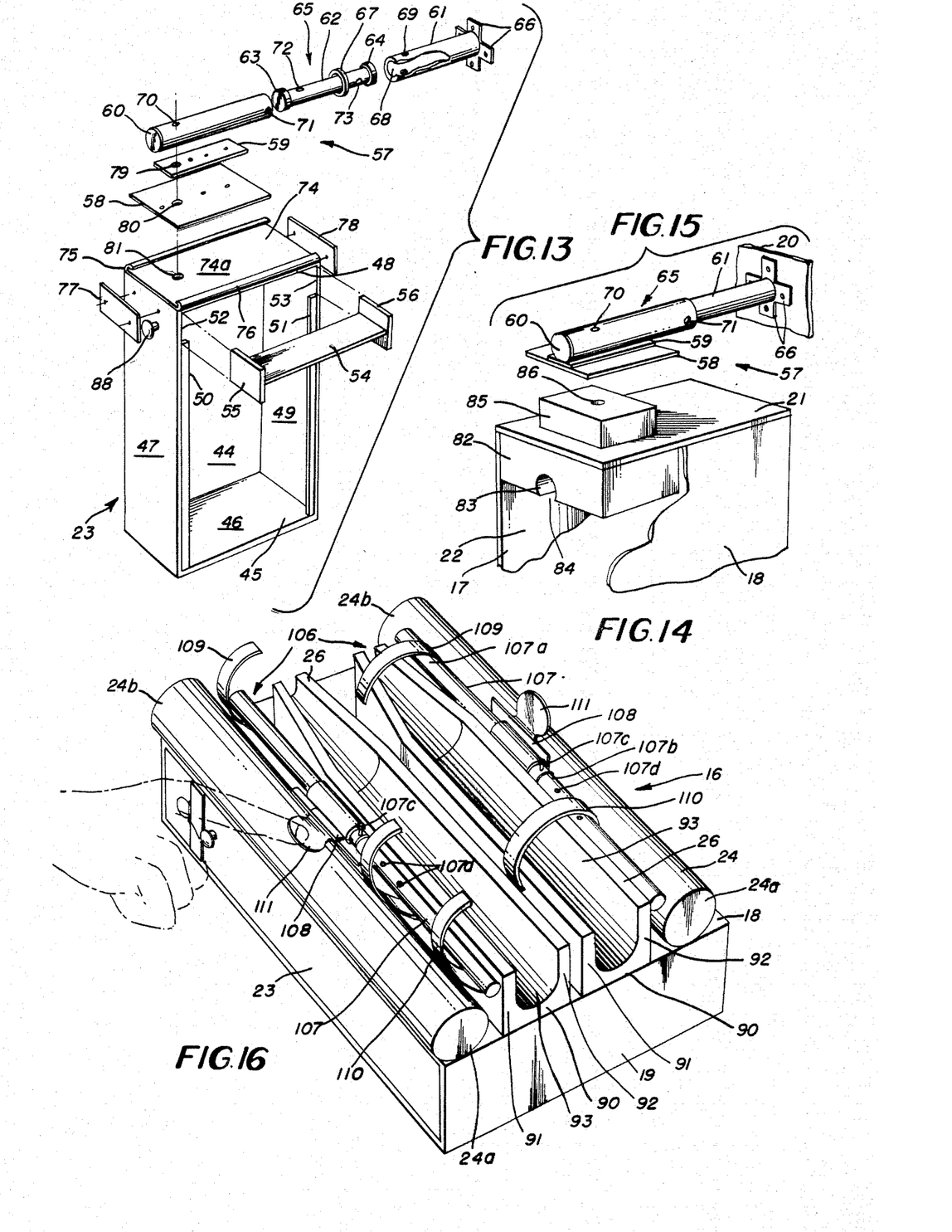
FIG. 13 is an exploded perspective view of the tackle drawer and mounting assembly of the invention.
FIG. 14 is a fragmentary perspective view of the top portion of the tackle box showing the open drawer receiving side of the box with the drawer and the tackle drawer slide and pivot assembly removed from the box.
FIG. 15 is a perspective view of the tackle drawer slide and pivot assembly mounted on the inner surface of the sidewall of the tackle box opposite the open side and showing only the upper portion of the sidewall of the tackle box on which the aforesaid assembly is mounted.
FIG. 16 is a perspective view of the tackle box of the invention with modified fishing rod holders mounted thereon.

FIG. 13 shows the tackle drawer 23 in vertical position with the means for slidably and rotatably mounting same in the tackle box 16 disassembled above the drawer. The tackle box drawer 23 comprises a closed bottom 44, an open front 45, and four sidewalls 46, 47, 48 and 49 perpendicular to the bottom 44. A pair of flanges 50 and 51 extend inwardly from and perpendicular to the sidewalls 47 and 49 respectively along their front edges. The flanges 50 and 51 start adjacent the sidewall 46 and terminate short of the opposite sidewall 48, providing gaps 52 and 53 which permit insertion of a partition 54 therethrough. The partition 54 includes rectangular end blocks 55 and 56 affixed perpendicular to opposite ends thereof. The blocks are of a height slightly less than the perpendicular distance between the bottom 44 and the inner surface of the flanges 50 and 51 so that the blocks serve as guides for sliding movement of the partition 54 within the drawer 23.

The tackle drawer slide and pivot assembly 57 includes a rectangular slide plate 58 which is adapted to slide in a slide plate track 74 on the outside of the sidewall 48 of the tackle box drawer 23. A separating brace, or spacer bar 59, is affixed on the upper surface of the slide plate 58 along its longitudinal center line by welding or other means for rigidly securing same to the slide plate. The spacer bar 59 is rigidly secured to the underside of the outer tube 60 of a telescoping arm assembly 65 including in addition to the outer tube 60, an inner tube 61 which slides inside of the outer tube, a piston rod 62 having pistons 63 and 64 which fit within the outer tube 60 and inner tube 61 respectively to provide internal support for the telescoping arm assembly 65 when the assembly is fully extended. The piston 63, at one end of the piston rod 62, is attached to the inside front end of tube 60 thereby holding the piston rod 62 stationary concentrically within the tube 60. The piston 64 on the opposite end of the piston rod 62 from piston 63 slidably fits inside of the inner tube 61, and is retained therein by a washer 67 or end cap secured to the outer end of the tube 61 after piston 64 is inserted. The inner telescoping tube member 61 includes mounting flanges 66 at one end for mounting the telescoping arm assembly 65 inside of the tackle box 16 on the sidewall 20 and parallel to the sidewall 21. A drop-pin hole 69 extends vertically through the inner tube 61 adjacent its outer end. The outer tube 60 includes drop-pin holes 70 and 71 spaced inwardly of its opposite ends with the hole 71 displaced 90° clockwise with respect to the hole 70 when viewed from the outer end of the tube 60. The piston rod 62 also has drop-pin holes 72 and 73 extending therethrough in alignment with the holes 70 and 71 respectively in the tube 60.

The drop-pin holes 70 and 72, through outer tube 60 and piston rod 62, are aligned with holes 79 and 80 extending through the spacer bar 59 and the slide plate 58. A drop-pin hole 81 is provided in the bottom of the slide plate track for receiving a drop-pin 87 when the holes 70, 72, 79 and 80 are aligned with the hole 81.

The slide plate track 74 includes inturned flanges 75 and 76 and a connecting web 74a overlying the sidewall 48. The slide plate 58 slides under the flanges 75 and 76 along the outer surface of the web 74a. Rectangular slide plate stops 77 and 78 are affixed to the sidewalls 47 and 49 respectively adjacent opposite ends of the slide plate track 74 after the slide plate is mounted within the track to close the ends of the track, and thereby to retain the slide plate 58 in the track 74.

FIG. 14 shows the top portion of the tackle box 16 with the open side 22 on the left. A block 82 with a cylindrical bore 83 extending longitudinally therethrough is mounted beneath the top side 21 adjacent the open front 22. The bottom surface of the block 82 intersects the bore 83 so as to provide an open slot 84 in the bottom of the block. The bore 83 receives the telescoping arm 65 therein with the spacer bar 59 located beneath the slot 84. A block 85 is mounted on top of the wall 21 of the tackle box 16, as seen in FIG. 14, above the block 82. A cylindrical bore 86 extending through the blocks 85 and 82 receives a drop-pin 87 as seen in FIG. 5.

When the slide and telescopic arm assembly 57 is fully assembled with the tackle box 16 and the tackle drawer 23, the slide plate 58 will be slidably mounted in the tract 74 on top of the tackle drawer 23 and the inner tube 61 of the telescopic arm 65 will be mounted inside of the tackle box 16 and spaced below and parallel to the top sidewall 21 thereof. The inner end of the inner tube 61 will be secured to the inner surface of the sidewall 20 of the tackle box by suitable means, such as fasteners extending through the flanges 66 into the wall 20.

In the closed position of the tackle drawer 23 inside of the tackle box 16, the telescopic arm 65 will be fully collapsed and the drawer may be latched in the closed position by the drop-pin 87 extending through the bore 86 in blocks 82 and 85 into the holes 69, 70, 72, 79, 80 and 81 in the slide and telescopic arm assembly 57.

The tackle drawer 23 may be opened by lifting the drop-pin 87 with one hand and by pulling the drawer knob 88 with the other hand to slide the drawer 23 out through the open side 22 of the tackle box. Pulling the drawer 23 fully out of the tackle box fully extends the telescopic arm 65 and slide assembly 57 so that the tackle drawer along with the slide 58 and the outer tube 60 may be rotated relative to the fixed inner tube 61 to the horizontal position shown in FIG. 7. The drawer may be locked in the horizontal position of FIG. 7 by dropping the drop-pin 87 through now aligned holes 71 and 73 in outer tube 60 and piston rod 62 and the hole 69 in the inner tube 61.

The fishing rod supports S mounted on the front of the tackle box 16 may be of various forms depending upon the type of fishing rods which the fisherman uses. The tubular receptacles 24, which are shown mounted along the outside edges of the tackle box 16 and which have a closed bottom 24a and an open top 24b, are intended to carry the outer end sections of the fishing rods when the rods are disassembled. The channel-shaped holders 26 are designed to hold the butt or handle end sections of the fishing rods. The channel-shaped holders 26 each have a bottom wall 90 secured to the front 18 of the tackle box 16, and a pair of spaced sidewalls 91, 92 between which is formed an elongated recess 93 which is shaped to receive the butt end section of a fishing rod therein (see FIGS. 3 and 5). The sidewalls 91 and 92 have multiple pairs of transversely aligned slots 94 cut therein at longitudinally spaced intervals to receive a strap 95 through a selected one of the pairs of slots (see FIGS. 5 and 7).

Adjacent the upper ends of the channel-shaped holder 26 are located spring biased arcuate clips 96. The clips 96 are hinged by hinge means 97 to the front of the tackle box 16 in a position to swing over the upper ends of the holders 26 to retain a fishing rod and reel therein. The hinge means 97 comprises a pair of spaced L-shaped bearing members 98, each with a base 99 secured to the front of the tackle box and an upstanding arm 100 perpendicular to the base with an aperture therethrough for receiving one end of a pivot pin 101. A coil spring 102, mounted on the pivot pin 101, has an extension 103 at one end bearing upon the front of the tackle box 16 and an extension 104 bearing upon the arcuate clip 96 biasing the clip 96 to its closed position. A handle 105 is provided at the free end of the clip 96 for manipulation of the clip.

While one type of spring clip 96 has been illustrated and described, other types of clips or other means capable of performing the same rod holding function as the clip 96 may be substituted within the scope of this invention.

Instead of using a separate strap 95 and clip 96 to hold the butt end section of a fishing rod in one of the channel-shaped holders 26, another holding means 106 is illustrated in FIG. 16. The holding means 106 comprises a telescoping rod 107 of adjustable length which is supported on the front of the tackle box 16 alongside of one of the receptacles 26 by means of a pivoted spring clip 108. Arcuate arms 109 and 110 at opposite ends of the telescoping rod 107 extend laterally from the telescoping rod over one of the channel-shaped receptacles 26. The arms 109 and 110 may be swung away from their position over the receptacle 26 by pressing down on the handle portion 111 of the spring clip 108 which supports the telescoping rod 107 alongside of the receptacle. With the arms 109 and 110 raised, a fishing rod and reel or butt end section may be placed in or removed from the receptacle 26. When the arms 109 and 110 are lowered, they will hold a fishing rod and reel or butt end section in the receptacle 26. It will be understood that the telescoping rod 107 comprises an outer tube 107a and an inner tube 107b slidable therein. The outer tube has a lock pin 107c therein for locking the inner tube 107b in a selected position by engaging one of the position holes 107d.

Various modifications of the present invention illustrated and described herein may become apparent to one with ordinary skill in the art, therefore, it is not intended that the present invention be limited to the specific embodiments illustrated and described herein, except as they are defined within the scope of the accompanying claims.

Some of the components of the invention disclosed herein may be exchanged with other components which will perform a corresponding function.

The latch member 31 (FIG. 5) for locking the tackle box 16 in vertical position may be substituted for other latch means which will provide a similar latching function. One such alternate latch means (not shown) may comprise a flat plate hinged to the carrier plate 14 just above the top side of the tackle box 16 as seen in FIG. 7 so that it will swing about an axis parallel with the top of the tackle box between a raised position above the tackle box and a lowered position overlying the tackle box. A coil spring may be incorporated in the hinge to bias the plate to its lowered position overlying and juxtaposed the top of the tackle box. The spring biased latch plate bearing against the top of the tackle box would normally hold the tackle box in the vertical position, however, a detent may be provided to project beneath the latch plate for engagement with an aligned aperture in the top of the tackle box for more positive securement of the tackle box in the vertical position as shown in FIG. 7.

With the latch 31, or any suitable latch which is substituted therefor unlatched, the tackle box may be rotated about the axis of pivot 15 to any selected angular position between the vertically oriented position shown in FIGS. 1 and 2 and a horizontal position as shown in FIG. 3. To retain the fishing tackle box in the selected angular position, various means may be utilized. A frictional drag sufficient to hold the tackle box in any selected angular position may be provided by utilizing a threaded bolt for the pivot 15 which, when screwed into the nut 15' attached to the inside of the back 17 of the tackle box, may be tightened to force the carrier plate 14 tightly against the hub portion 41' of the circular plate 41, which is in turn tightened against the back 17 with sufficient force to hold the tackle box so that it will not freely turn relative to the carrier plate 14. The ease with which the tackle box may be rotated will depend upon how tight the pivot bolt 15 is screwed into the nut 15'.

Positive locking means may also be used for holding the tackle box in selected angular position, such as in 45° and 90° angular displacements from the vertical or in any degree of angular displacement which is appropriate.

Instead of securing the carrier 10 to the body of a fisherman by means of a shoulder strap as illustrated, a belt encircling the waist of a fisherman may be used alone or in combination with the shoulder strap.

The fishing tackle drawer 23 may be subdivided and compartmentalized in any appropriate manner for holding the items of fishing tackle which a fisherman may wish to carry. A shallow tray may be provided inside of drawer 23 to divide the drawer into upper and lower compartments.

The fishing rod holders mounted on the front of the tackle box 16 may be arranged in various positions other than as shown in the drawings. For example, the tubular holders 24 may be positioned where the channel-shaped holders 26 are shown in FIG. 16, and the channel-shaped holders 26 may be located along the outer edges of the tackle box where the tubular holders 24 are shown in FIG. 16.

As previously described, the tubular holders 24 are intended to hold the outer end sections of fishing rods. The outer sections will normally have rings or eyes which serve as line guides mounted thereon. Since the rings for different types of fishing rods vary in size, it is contemplated that the tubular holders 24 may be expandable and contractible in diameter. An example of an expandable tube is a tube formed from flat sheet material which is bent into a tube with overlapping opposite sides. The tube can then be expanded or contracted by decreasing or increasing the amount of overlap of the opposite sides of the bent sheet. Suitable means such as an expandable and contractible hoop with means to lock the hoop in selected sizes may be attached to the tube to hold it in the selected diameter.

Inorder to hold rod sections in the tubes 24, clips, bands or other securing means may be mounted adjacent the open ends 24b to clasp the rod sections and prevent them from falling out of the tubes when the tackle box 16 is rotated on the carrier plate 14 to position the fishing rod holders 24 and 26 in a substantially horizontal position.

The open channel-shaped holders 26 may be of various shapes best suited for holding the butt end of a fishing rod, with or without a reel mounted thereon. Since the carrier of this invention is intended to provide a fisherman with ready access to several types of fishing rods for quick exchange when needed, one or more completely assembled fishing rods with appropriate reels and tackle thereon may be held in the available channel-shaped holders 26. The means 106 for holding the fishing rods in the channel-shaped holders may be of various types other than as illustrated. Preferrably the holding means will provide ready release of a rod from the channel-shaped holder 26 when the fisherman wishes to remove the fishing rod and will allow quick replacement of the rod in the holder 26 and provide firm securement of the rod in the holder when it is placed therein. Also it is preferable that the holding means 106 will be adjustable to locate the holding elements, such as the arms 109 shown in FIG. 16, at different positions along the length of the holder 26 to accommodate different fishing rods and reels.

Unless otherwise stated in the specification and claims, the term fishing rod, or fishing rods, as used therein is intended in the broadest sense to mean an assembled fishing rod or rods and disassembled rod sections thereof, with or without fishing reels and other tackle assembled thereon. In some instances, the fisherman may wish to have one or more completely assembled fishing rod supported by the carrier 10 for ready access when a change in the type of fishing rod being used is desired. In other instances, such as when traveling, it may be preferable to have the fishing rod or rods disassembled and supported by the carrier.

Preferred embodiments of the invention have been described in detail for the purpose of illustration but it will be obvious that numerous modifications and variations may be resorted to without departing from the spirit of the invention in its broadest aspects.

What is claimed is:

1. A carrier for fishing rods, reels, tackle and the like to be worn by a fisherman comprising a carrier plate, means for supporting the carrier plate on the body of the fisherman and normally alongside of one hip and near the fisherman's waist, a tackle box, pivot means mounting said tackle box on said carrier plate for selective rotation between a first position and a second position displaced substantially ninety degrees in either direction from said first position, holding means interacting with said tackle box and said carrier plate for releasably holding said tackle box against rotation relative to said carrier plate, and support means mounted on said tackle box for holding fishing rods, said support means being disposed on said tackle box to hold said fishing rods in a substantially vertical position when said tackle box is in said first position and to hold said fishing rods in substantially horizontal position when the tackle box is in said second position, said tackle box comprising a shallow, rectangular box having a back mounted adjacent and parallel to said carrier plate, a front spaced outwardly from and parallel to said back and four sides between said front and back with adjacent sides perpendicular and opposite sides parallel to each other, one of said four sides being open for receiving a sliding drawer and the remaining sides being closed, said box when in said first position having said open side vertically oriented and facing forward with respect to the user, a shallow rectangular tackle drawer slidable through said open side into and out of said tackle box between a fully closed position and a fully open position.

2. The carrier of claim 1 wherein said means for supporting the carrier plate comprises a shoulder strap having opposite ends attached to said carrier plate.

3. The carrier of claim 1 together with mounting means interacting with said tackle box and said tackle drawer for supporting the tackle drawer for reciprocation between a closed position inside of the tackle box and a fully withdrawn position outside of said tackle box in which position said mounting means supports said tackle drawer for rotation through an angle of substantially 90° whereby the drawer may be swung from a substantially vertically oriented position to a substantially horizontal position in front of and adjacent the waist of the user when said tackle box is in said first position.

4. The carrier of claim 3 together with means for selectively latching said tackle drawer in its closed position and in its fully withdrawn and ninety-degree rotated position.

5. The carrier of claim 4 wherein one of the four sides of said tackle box adjacent said open side is a top side when the tackle box is in its vertically oriented position, said tackle drawer having a back, a front and four sides between said front and back, one of said sides being an upper side when the tackle box is in its vertically oriented position, said mounting means comprising a telescoping arm mounted within the tackle box with one end thereof fixed to the side of the tackle box opposite said open side, said telescoping arm extending parallel with and adjacent to said top side of the tackle box and having an inner section including said one end fixed inside said tackle box and an outer section slidable and rotatable relative to said inner section, and means securing said outer section of said telescoping arm parallel to the upper side of tackle drawer.

6. The carrier of claim 6 wherein said means securing said outer section of said telescoping arm parallel to said upper side of said tackle drawer includes a linear track secured to the top side of said tackle drawer outside thereof and parallel to said top side, and a slide reciprocable in said track between limits set by stops affixed adjacent opposite ends of said track, said slide being fixed beneath said outer section of said telescoping arm.

7. The carrier of claim 6 wherein said latching means comprises a latch pin mounted on top of said tackle box for projection through said top of said tackle box, and for selective engagement in one of a first set of holes in said outer and inner sections of said telescoping arm and in said slide and track which are axially aligned when said tackle drawer is in its fully closed position in said tackle box, and a second set of holes in said inner and outer telescoping arms which are axially aligned when said tackle drawer is fully withdrawn from said tackle box and is rotated approximately 90° about the axis of said telescoping arm.

8. The carrier of claim 1 wherein said holding means comprises an adjustable friction drag which is adjustable to hold the tackle box in a selected position between and including said first and second positions.

9. The carrier of claim 8 wherein said friction drag includes said pivot and adjacent surfaces between said carrier plate and said tackle box, said pivot comprising a pivot pin having a head and shank with a threaded end opposite said head and nut means fixed to one of said carrier plate and said tackle box for threaded engagement with the threaded end of said shank, said pivot pin being extended through said carrier plate and adjacent surface of said tackle box with its head outside of the other of said carrier plate and tackle box and having its threaded end screwed into said nut sufficiently whereby the friction between said friction surfaces prevents free rotation of the tackle box from a selected position.

10. The carrier of claim 1 wherein said holding means comprises latch means for holding said tackle box in said first position.

11. The carrier of claim 1 wherein said support means for said fishing rods is mounted on said front of said tackle box and comprises at least one receptacle for releasably holding a fishing rod or fishing rod section therein.

12. The carrier of claim 11 wherein said support means comprises at least two diverse receptacles, one of said receptacles being a tubular receptacle for holding a fishing rod section therein, and another of said receptacles being an open channel-shaped receptacle having a recess therein shaped to receive the handle end section of a fishing rod, and means for releasably holding the handle end section of a fishing rod in said channel-shaped receptacle.

13. The carrier of claim 12 wherein said tubular receptacle is expandable and contractible in diameter to accept fishing rod sections of different sizes.

14. The carrier of claim 12 wherein the recess of said channel-shaped receptacle is shaped to receive therein the handle end section of an assembled fishing rod with a reel mounted thereon.

15. A carrier for fishing rods, reels, tackle and the like to be worn by a fisherman comprising a carrier plate, means for supporting the carrier plate on the body of the fisherman and normally alongside of one hip and near the fisherman's waist, tackle box pivot means mounting said tackle box on said carrier plate for selective rotation between a first position and a second position displaced substantially ninety degrees in either direction from said first position, holding means interacting with said tackle box and said carrier plate for releasably holding said tackle box against rotation relative to said carrier plate, and support means mounted on said tackle box for holding fishing rods, said support means being disposed on said tackle box to hold said fishing rods in a substantially vertical position when said tackle box is in said first position and to hold said fishing rods in substantially horizontal position when the tackle box is in said second position, said tackle box having a back adjacent said carrier plate and a front opposite said carrier plate, said support means for said fishing rods being mounted on said front and comprising at least two diverse receptacles, one of said receptacles being a tubular receptacle for holding a fishing rod section therein and another of said receptacles being an open-channel shaped receptacle having a recess therein shaped to receive the handle end section of a fishing rod, and means for releasably holding the handle end section of a fishing rod in said channel-shaped receptacle, said recess of said channel-shaped receptable being shaped to received therein the handle end section of an assembled fishing rod with a reel mounted thereon, said means for releasably holding the handle end section of a fishing rod in said channel-shaped receptacle comprising an elongated bar, clamping arms extending laterally from said bar, and spring biased means supporting said elongated bar on said tackle box along one side of said open channel-shaped receptacle for rocking movement, said spring biased means normally positioning said bar with its clamping arms extending over said recess of said channel-shaped receptacle and being manually operable to rock the bar thereby lifting the clamping arms away from said recess for release of a fishing rod positioned therein.

16. The carrier of claim 15 wherein said elongated bar comprises a pair of telescoping sections with means to selectively adjust the length of said bar, there being at least one of said clamping arms on each section of said bar whereby varying the length of said bar varies the distance between said clamping arms.

17. A carrier for fishing rods, reels, tackle and the like to be worn by a fisherman comprising a carrier plate, means for supporting the carrier plate on the body of a fisherman and normally alongside of one hip and near the fisherman's waist, a tackle box, pivot means mounting said tackle box on said carrier plate for selective rotation between a first position and a second position displaced substantially ninety degrees in either direction from said first position, holding means interacting with said tackle box and said carrier plate for releasably holding said tackle box against rotation relative to said carrier plate, and support means mounted on said tackle box for holding at least one fishing rod, said support means being disposed on said tackle box to hold said fishing rod in a substantially vertical position when said tackle box is in said first position and to hold said fishing rod in a substantially horizontally position when the tackle box is in said second position, said carrier plate being flat and having one side normally supported to be worn adjacent the hip of the fisherman and an opposite side which is adjacent to said tackle box, said pivot means including a pivot projecting perpendicularly from said opposite side of said plate on which said tackle box is mounted to rotate relative to said carrier plate, said tackle box comprising a shallow, rectangular box having a back mounted adjacent and parallel to said carrier plate, a front spaced outwardly from and parallel to said back and four sides between said front and back with adjacent sides perpendicular and opposite sides parallel to each other, one of said four sides being open for receiving a sliding drawer and the remaining sides being closed, said box when in said first position having said open side vertically oriented and facing forward with respect to the user, a shallow rectangular tackle drawer slidable through said open side into and out of said tackle box between a fully closed position and a fully open position.

* * * * *